United States Patent [19]

Ammann

[11] 4,165,469

[45] Aug. 21, 1979

[54] APPARATUS AND METHOD FOR PRODUCING VISIBLE COHERENT LIGHT AT A PLURALITY OF WAVELENGTHS

[75] Inventor: Eugene O. Ammann, Los Altos, Calif.

[73] Assignee: GTE Sylvania Incorporated, Stamford, Conn.

[21] Appl. No.: 935,216

[22] Filed: Aug. 21, 1978

[51] Int. Cl.² ............................................. H03F 7/00
[52] U.S. Cl. ................................................... 307/426
[58] Field of Search ..................... 307/88.3; 321/69 R

[56] References Cited

U.S. PATENT DOCUMENTS

| 3,536,931 | 10/1970 | Boyd et al. .......................... 307/88.3 |
| 4,048,516 | 9/1977 | Ammann ............................. 307/88.3 |

Primary Examiner—Rudolph V. Rolinec
Assistant Examiner—Darwin R. Hostetter
Attorney, Agent, or Firm—John F. Lawler

[57] ABSTRACT

A pulsed solid state tunable laser comprises a Q-switched pump laser at kilohertz (kHz) pulse repetition frequencies and a non-centrosymmetric Raman crystal, such as lithium iodate ($LiIO_3$), through which the pump beam is directed at an angle $\theta$ to the crystal optical axis. Stimulated Raman scattering (SRS) occurs in the crystal to produce Stokes lines at substantial average output powers, which lines react with the pump signal in the nonlinear crystal at predetermined values of $\theta$ to generate second harmonics (SHG) and sum frequencies (SFG) of the pump and Stokes lines which constitute visible light outputs. Changing the value of $\theta$ by rotating the crystal, for example, permits the apparatus to be step-tuned to phasematch the signals and produce visible light outputs at a plurality of wavelengths.

10 Claims, 3 Drawing Figures

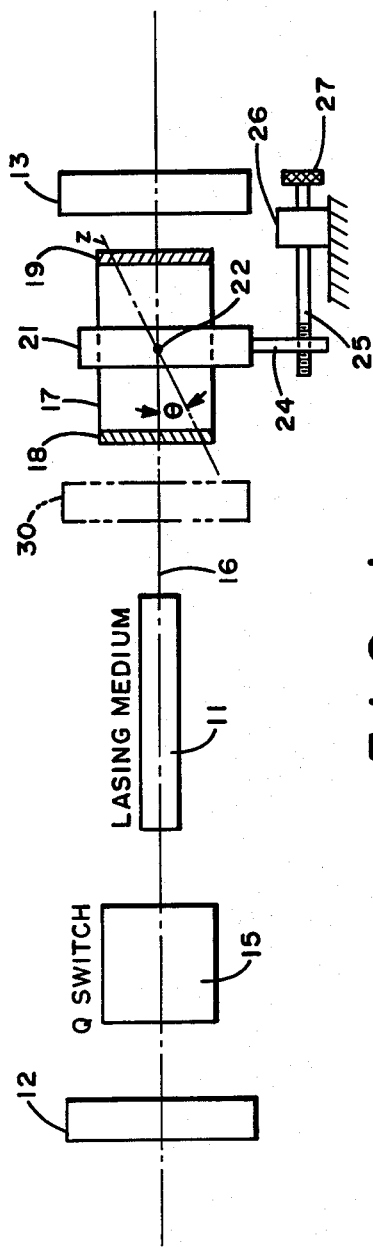
FIG. I
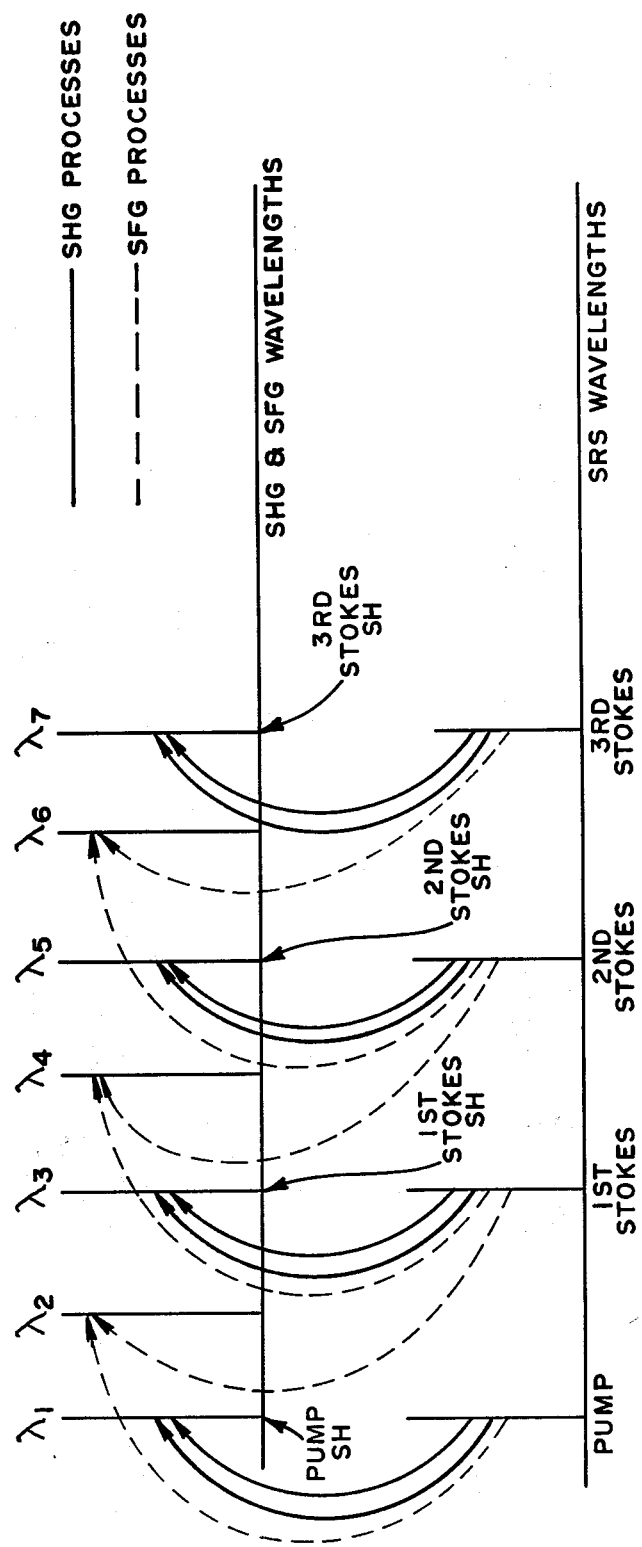
FIG. 3

APPARATUS AND METHOD FOR PRODUCING VISIBLE COHERENT LIGHT AT A PLURALITY OF WAVELENGTHS

BACKGROUND OF THE INVENTION

This invention relates to lasers and more particularly to laser apparatus for producing a coherent light output at visible portions of the spectrum.

There is a need for a source of tunable coherent light at visible wavelengths, i.e., 4000–7500 Å. Coherent light at these wavelengths is useful for such diverse applications as spectroscopy, electro-optical warfare, and as a general research tool. Prior art apparatus for generating tunable coherent light is the dye laser, examples of which are described in the book "Dye Lasers," Topics in Applied Physics, Volume 1, F. P. Schafer, editor, Springer-Verlag, New York, 1973. The principal disadvantage of the dye laser is the difficulty involved in tuning it over a substantial wavelength range. In order to change the output wavelength by more than about 400 Å, it is necessary to change the dye in the laser. This is time consuming, inconvenient, and imposes other limits on the utility of the laser. In addition, dyes deteriorate with time and must be periodically replaced.

This invention is directed to a source of visible coherent light which overcomes these disadvantages.

OBJECTS AND SUMMARY OF INVENTION

A general object of the invention is the provision of solid state laser apparatus capable of producing visible light at a plurality of wavelengths.

A further object is the provision of such laser apparatus that is capable of being step-tuned to produce outputs at a plurality of wavelengths in the visible band.

A further object is the provision of a method of generating visible coherent light at a plurality of wavelengths by step-tuning a laser.

These and other objects of the invention are achieved with a laser arranged to pump a non-centrosymmetric crystal and cause simultaneous occurrence of SRS and SHG and/or SRS and SFG to produce visible coherent light outputs. Phasematching of the second harmonics and sum frequencies to produce the visible light outputs is achieved by selection of the orientation of the crystal optic axis with respect to the direction of pump beam propagation in the crystal and accordingly the apparatus is step-tuned by changing the angle $\theta$, for example, by rotating the crystal relative to the direction of propagation of the pump beam incident on the crystal.

DESCRIPTION OF THE DRAWINGS

FIG. 1 is a block diagram showing the laser apparatus configuration embodying this invention;

FIG. 3 is a diagram showing the interaction of the pump and Stokes signals by SHG and SFG processes to produce the plurality of visible light outputs.

DESCRIPTION OF PREFERRED EMBODIMENTS

Figure 2:
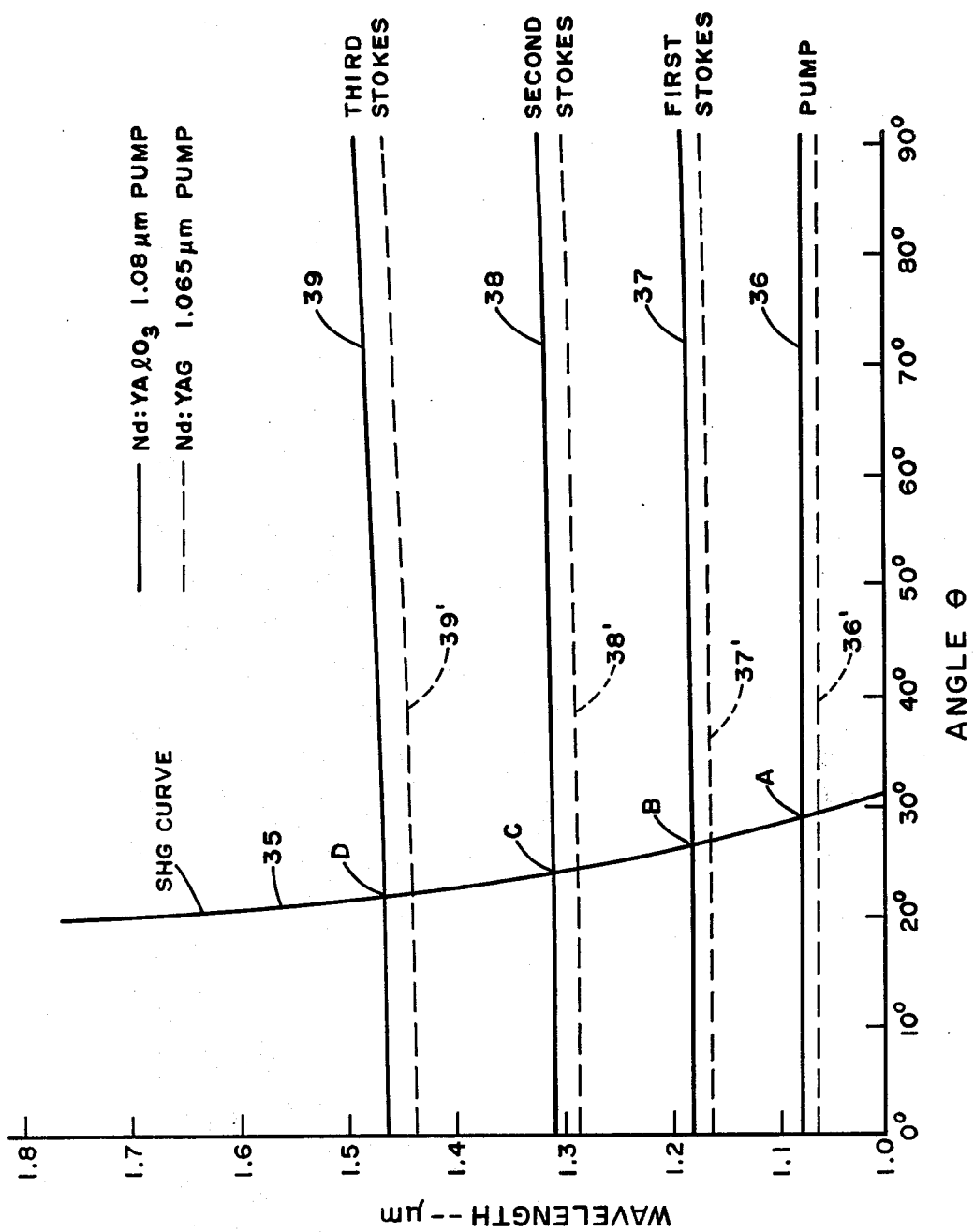
FIG. 2 shows a set of curves illustrating the tuning of the laser in accordance with this invention.

U.S. Pat. No. 4,048,516 describes laser apparatus for producing stimulated Raman scattering (SRS) at kHz pulse repetition rates. Briefly, the process of Raman scattering may be characterized as follows. A pump beam, typically from a laser, is incident upon the Raman medium. The pump beam decomposes into a Stokes output, which is photon-like, and a Raman output. The Raman output is closely tied to a natural vibrational mode of the Raman medium and can be either purely phonon-like or partially phonon-like and photon-like in character.

In the decomposition process, conservation of energy must be satisfied as stated by the frequency equation $$\omega_P = \omega_S + \omega_R, \tag{1}$$

and conservation of momentum must be satisfied as stated by the wavevector equation $$\vec{K}_P = \vec{k}_S + \vec{k}_R. \tag{2}$$

Subscripts P, S and R refer to the pump, Stokes and Raman waves, respectively.

In addition to the generation of the first Stokes output, SRS also enables the decomposition process to repeat itself with the first Stokes wave acting as a pump and decomposing into a second Stokes photon and a Raman phonon. Equations that are similar to (1) and (2) are written as giving $$\omega_{S1} = \omega_{S2} + \omega_R \tag{3}$$

and $$\vec{k}_{S1} = \vec{k}_{S2} + \vec{k}_R \tag{4}$$

where the subscripts S1 and S2 denote first Stokes and second Stokes, respectively. The process may continue further, with a second Stokes photon decomposing into a third Stokes photon and a Raman phonon. In general, the process becomes weaker as it continues to higher orders.

Another process that is of importance in this invention is second harmonic generation (SHG). SHG may be understood as two photons at the fundamental (pumping) wavelength merging to produce a single photon at the second-harmonic wavelength. In this process, conservation of energy is again required, giving $$2\omega_F = \omega_{SH} \tag{5}$$

and conservation of momentum similarly requires $$2\vec{k}_F = \vec{k}_{SH} \tag{6}$$

where the subscripts F and SH refer to the fundamental and second harmonic, respectively. In order to achieve phasematching implicit in equation (6), SHG in a crystal such as LiIO$_3$ utilizes an O-ray as a fundamental and generates a second harmonic polarized as an E-ray. In addition, the crystal must be oriented at the correct phasematching angle $\theta$ in order to satisfy equation (6).

Still another process utilized in this invention is that of sum-frequency generation (SFG). SFG is very similar to SHG except that the pumping photons have different wavelengths instead of being identical. In SFG, two dissimilar photons merge to produce a single photon, with conservation of energy and momentum being satisfied when $$\omega_{F1} + \omega_{F2} = \omega_{SF} \tag{7}$$

and $$\vec{k}_{F1} + \vec{k}_{F2} = \vec{k}_{SF}. \qquad (8)$$

The subscripts F1 and F2 refer to the dissimilar pumping beams, such as the pump and first Stokes beams, or the first and second Stokes beams, etc., and the subscript SF refers to the generated sum frequency. The same phasematching considerations that were described for SHG are also applicable for SFG.

Referring now to the drawings, FIG. 1 illustrates laser apparatus 10 comprising a lasing medium 11 such as neodymium doped yttrium aluminate (Nd:YAlO₃) in a cavity defined by laser mirrors 12 and 13. Medium 11 is continuously pumped by a light source, not shown, which may consist of krypton-arc lamps, and is repetitively switched by Q-switch 15 disposed in a laser cavity between medium 11 and mirror 12 for propagating high intensity pulses of light along axis 16. Also disposed in the laser cavity is a Raman medium 17 comprising a non-centrosymmetric crystal, preferably lithium iodate (LiIO₃) having its x-axis in a plane perpendicular to the plane of the drawing and a z or optic axis disposed at an angle $\theta$ to the direction of pump light propagation within the crystal. A non-centrosymmetric crystal is defined as a crystal whose microscopic structure lacks a center of symmetry. Only non-centrosymmetric crystals have the second-order nonlinear coefficients which are necessary to producing SHG or SFG. End faces 18 and 19 of crystal extend perpendicular to axis 16 and have anti-reflection coatings centered at the laser pump wavelength so that the pump, Stokes and visible light output waves trasverse the crystal substantially without reflection.

In order to change the value of the angle $\theta$ in accordance with this invention, crystal 17 is supported in a clamp 21 for rotation about transverse axis 22 which is perpendicular to and intersects axis 16. Clamp 21 has an extension 24 with a tapped hole engaged by the threaded end of screw 25 supported in a fixed boss 26 for rotation about its axis. A knurled head 27 on screw 25 permits the latter to be rotated in either direction to move clamp extension 24 along the screw and thereby selectively adjustably pivot clamp 21 about axis 22.

Mirrors 12 and 13 are highly reflective (HR) at the laser wavelength (1.08 μm for Nd:YAlO₃) as well as at the wavelengths of the first, second and third Stokes modes (1.18 μm, 1.31 μm and 1.47 μm, respectively, for a 1.08 μm pump beam in LiIO₃). In other words, mirrors 12 and 13 define the cavity for both the laser and Raman oscillators. This invention may also be practiced with a three-mirror embodiment, the third mirror being shown in broken lines at 30. In this embodiment, the reflectivities of mirrors 12, 13 and 30 are selected so that mirrors 12 and 13 define the laser cavity and mirrors 30 and 13 define the Raman cavity. Thus mirrors 12 and 13 are HR at the pump wavelength, mirrors 30 and 13 are HR at the Stokes wavelengths, and mirror 30 is highly transmissive (HT) at the pump wavelength.

In the two-mirror and three-mirror embodiments, all mirrors may be HT at the visible output wavelengths to obtain bidirectional visible light outputs. Alternatively, only one of the outside mirrors may be HT at the visible light wavelengths in order to constrain the useful output to a single propagation direction.

In accordance with this invention, SRS and phasematched SHG and SFG occur simultaneously in crystal 17 and produce visible light outputs. Phasematching occurs at different values of the angle $\theta$ so that pivoting of clamp 21 about axis 22 by rotation of screw 25 changes $\theta$ and step-tunes the apparatus to provide outputs at a plurality of wavelengths in the visible band. The tuning process is indicated in FIG. 2 by the curve 35 which represents the variations in the Raman frequency with changes in angle $\theta$. The solid horizontal lines 36, 37, 38 and 39 represent the pump, first Stokes, second Stokes and third Stokes wavelengths, respectively, for changes in $\theta$ for Nd:YAlO₃. The broken line horizontal plots 36', 37', 38' and 39' represent corresponding frequencies for a Nd:YAG pump source. The intersections of curve 35 with lines 36–39 at A, B, C and D, respectively, denote the wavelengths of the second harmonics of the pump, first, second, and third Stokes signals, respectively. By way of example, the values of the second harmonics at the intersections A, B, C and D in the embodiment of the invention shown in FIG. 1 (expressed in microns) are 0.540, 0.592, 0.655 and 0.734. Slightly different wavelengths are represented by the intersections of the curve 35 with lines 36'–39', inclusive.

Shown schematically in FIG. 3 are representations of the processes by which second-harmonic and sum frequency outputs are generated by the pump and the several Stokes lines. The second harmonic wavelength $\lambda_1$ is generated by the action of the pump signal as indicated by the solid curved lines connecting the pump and the $\lambda_1$ lines. Similarly, the first, second and third Stokes lines produce second harmonics at $\lambda_3$, $\lambda_5$ and $\lambda_7$, respectively.

In addition, visible coherent light outputs at wavelengths $\lambda_2$, $\lambda_4$ and $\lambda_6$ are generated by the simultaneously occurring SFG process indicated in broken lines. As shown, $\lambda_6$ is produced by the second and third Stokes lines through the SFG process. Thus both the nonlinear SHG and SFG processes contribute to the generation of the seven spectrally spaced wavelengths in the visible spectrum as the laser apparatus is step-tuned by rotation of crystal 17.

By way of example, an embodiment of the invention which has been built and successfully operated is as follows:

| | |
|---|---|
| Lasing medium 11 | Nd:YAl₃ |
| λp | 1.080 μm |
| Pump lamp | krypton-arc (cw) |
| Crystal 17 | LiIO₃ |
| Length | 4 cm |
| Optic axis angle (relative to normal to end faces) | 26.5° |
| Q-switch 15 | |
| Type | acousto-optic |
| Repetition rate | 1–10 kHz |
| Cavity | |
| Number of mirrors | 2 |
| Length (between mirrors) | 65 cm |

Measured operating characteristics and parameters of the above laser apparatus are listed in Table I.

TABLE I

| Output Wavelength | Non-Linear Process | Driving Beam(s) | Average (One-Way) Output Power | Pulse Length | Peak Pulse Power | Measured Phasematch Angle $\theta$ |
|---|---|---|---|---|---|---|
| 0.540 μm | SHG | Pump | 1.13 W | 160 ns | 2.35 kW | 29.4° |
| 0.565 μm | SFG | Pump and First Stokes | 78 mW | 40 ns | .65 kW | 28.0° |
| 0.592 μm | SHG | First Stokes | 472 mW | 45 ns | 3.50 kW | 26.7° |
| 0.622 μm | SFG | First Stokes and Second Stokes | 98 mW | 30 ns | 1.08 kW | 25.4° |
| 0.655 μm | SHG | Second Stokes | 107 mW | 25 ns | 1.43 kW | 24.2° |
| 1.080 μm | | (Pump) | 2.0 W | 140 ns | 4.76 kW | |

The following is the method of generating coherent light at a plurality of wavelengths in the visible spectrum according to this invention. If crystal 17 is tilted to some angle at which it does not produce phasematched SHG or SFG, SRS occurs as described in the above identified patent and first, second, and third Stokes wavelengths are generated. If mirrors 12 and 13 are HR at the pump and Stokes wavelengths, none of this energy is coupled out. As crystal 17 is pivoted about axis 22 by rotation of screw 25 to one of the SHG or SFG phasematching angles, a visible output is generated and is transmitted out through mirror 13. Thus by a single adjustment, namely, tilting or pivoting crystal 17 to different phasematching angles, different visible outputs are obtained from the apparatus.

What is claimed is:

1. Pulsed tunable laser apparatus having outputs in the visible optical wavelengths comprising
    a laser having
        a lasing medium,
        means to excite said lasing medium whereby to produce a pump beam of coherent light having a wavelength $\lambda_p$ greater than 8000 Å (near infrared), and
        first and second laser mirrors spaced from opposite sides respectively of said medium and traversing said beam whereby to define the laser cavity,
    switch means in said laser cavity operative on said beam,
    means to activate and deactivate said switch means whereby to produce a succession of pulses of said coherent light,
    a non-centrosymmetric crystal between said lasing medium and said second mirror and positioned to be traversed by said light pulses whereby to cause stimulated Raman scattering (SRS) of the light and thereby to produce Stokes wavelengths, said crystal having an optic axis and an angle $\theta$ with respect to the pulsed beam propagation direction within the crystal,
    means to adjustably support said crystal for movement relative to said pulsed beam whereby $\theta$ is selectively changeable, and
    means to cause said Raman scattered light to oscillate through said crystal comprising at least one of said mirrors whereby to produce visible light outputs having a plurality of wavelengths corresponding to a like plurality of values of $\theta$,
    said mirrors being non-transmissive at $\lambda_p$ and at said Stokes wavelengths, at least one of said mirrors being transmissive at visible light wavelengths between 4000 and 7000 Å whereby coherent light in the latter wavelength range is outputted from said apparatus.

2. The apparatus according to claim 1 in which said mirrors are highly reflective at $\lambda_p$, both of said mirrors being non-transmissive at said Stokes wavelengths and transmissive at said visible light wavelengths.

3. The apparatus according to claim 1 in which said mirrors are non-transmissive at $\lambda_p$ and at said Stokes wavelengths, one of said mirrors being non-transmissive at said visible light wavelengths and the other being transmissive at said visible light wavelengths whereby the latter are unidirectionally outputted from said apparatus.

4. The apparatus according to claim 1 with a third mirror between said lasing medium and said crystal, said first and second mirrors being highly reflective at $\lambda_p$, said third mirror being transmissive at $\lambda_p$ and non-transmissive at said Stokes wavelengths, said second mirror being transmissive at said visible light wavelengths whereby the latter are outputted from the apparatus through said second mirror.

5. The apparatus according to claim 1 in which the wavelengths of said outputs are spectrally spaced whereby adjustment of $\theta$ step-tunes said apparatus.

6. The apparatus according to claim 1 in which said coherent light outputted therefrom comprises harmonics of said pump beam and of said Stokes wavelengths.

7. The apparatus according to claim 6 in which said coherent light outputted therefrom comprises the sum frequencies of said pump beam and said Stokes wavelengths.

8. The method of generating a coherent light beam at a plurality of wavelengths in the visible spectrum consisting of the steps of
    directing a laser pump beam having a wavelength $\lambda_p$ through a non-centrosymmetric crystal at an angle $\theta$ with the crystal optic axis and producing by stimulated Raman scattering (SRS) Stokes and Raman modes having wavelengths $\lambda_S$ and $\lambda_R$, respectively, whereby to satisfy the conditions $\omega_P = \omega_S + \omega_R$ and $\vec{k}_P = \vec{k}_S + \vec{k}_R$ where $\omega_P$, $\omega_S$ and $\omega_R$ are the pump, Stokes and Raman frequencies, respectively, and $\vec{k}$ represents the wavevectors for said frequencies,
    causing said Stokes and Raman modes to oscillate through said crystal,
    selectively changing the angle $\theta$ through a plurality of different values,
    deriving spectrally spaced coherent light outputs from said crystal at a plurality of wavelengths in the visible spectrum corresponding to said plurality of different values, respectively, of $\theta$, and separating said outputs from said laser pump beam and from said Stokes and Raman modes.

9. The method of generating coherent light at a plurality of wavelengths in the visible spectrum consisting of the steps of directing a laser pump beam through a non-centrosymmetric crystal at an angle $\theta$ with the crystal optic axis, simultaneously producing stimulated Raman scattering (SRS) and phasematched second harmonic generation (SHG) in said crystal, selectively changing the angle $\theta$ through a plurality of different values and thereby producing outputs from said crystal at a plurality of wavelengths in the visible spectrum corresponding to said plurality of different values, respectively, of $\theta$, and separating said outputs from coherent light at wavelengths outside the visible spectrum.

10. The method of generating coherent light at a plurality of wavelengths in the visible spectrum consisting of the steps of directing a laser pump beam through a non-centrosymmetric crystal at an angle $\theta$ with the crystal optic axis, simultaneously producing stimulated Raman scattering (SRS) and phase matched sum frequency generation (SFG) in said crystal, selectively changing the angle $\theta$ through a plurality of different values and thereby producing outputs from said crystal at a plurality of wavelengths in the visible spectrum corresponding to said plurality of different values, respectively, of $\theta$, and separating said outputs from coherent light at wavelengths outside the visible spectrum.

* * * * *